Figure 2:
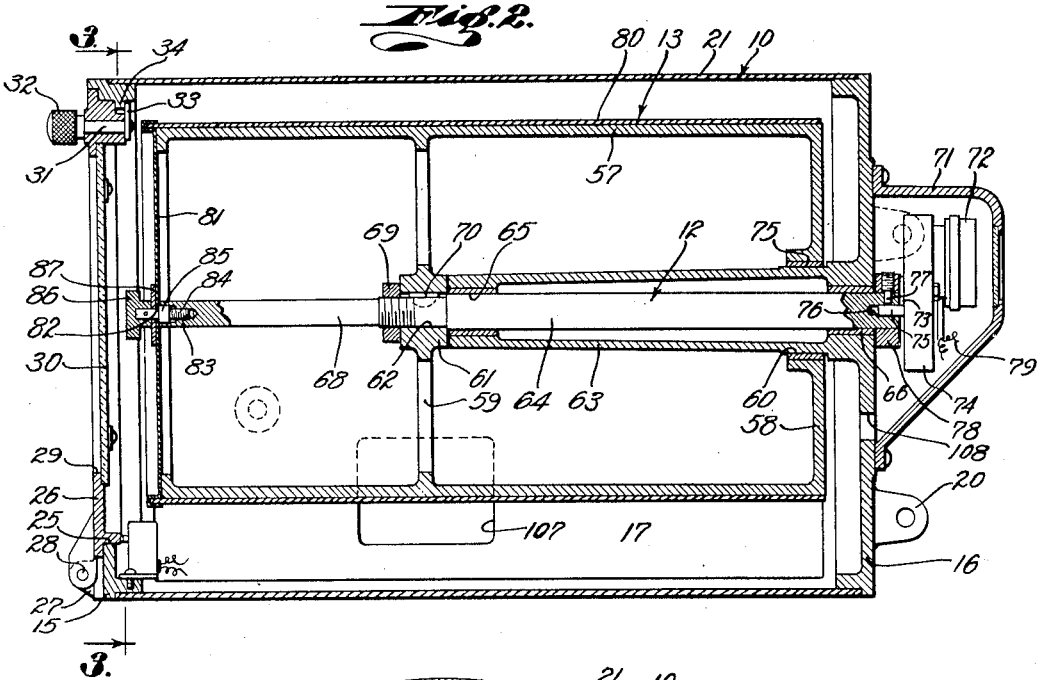

Dec. 22, 1942. H. HARVEY 2,306,056
CONTROL MEANS FOR WASHING MACHINES AND THE LIKE
Filed Aug. 14, 1940 2 Sheets-Sheet 1
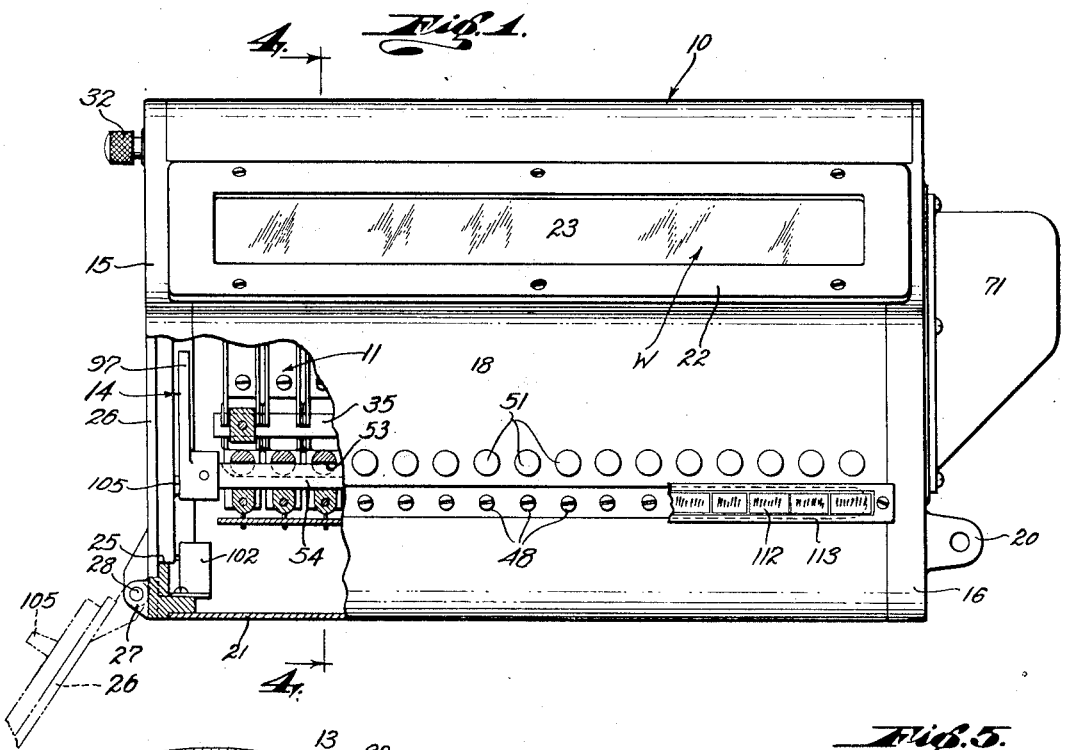
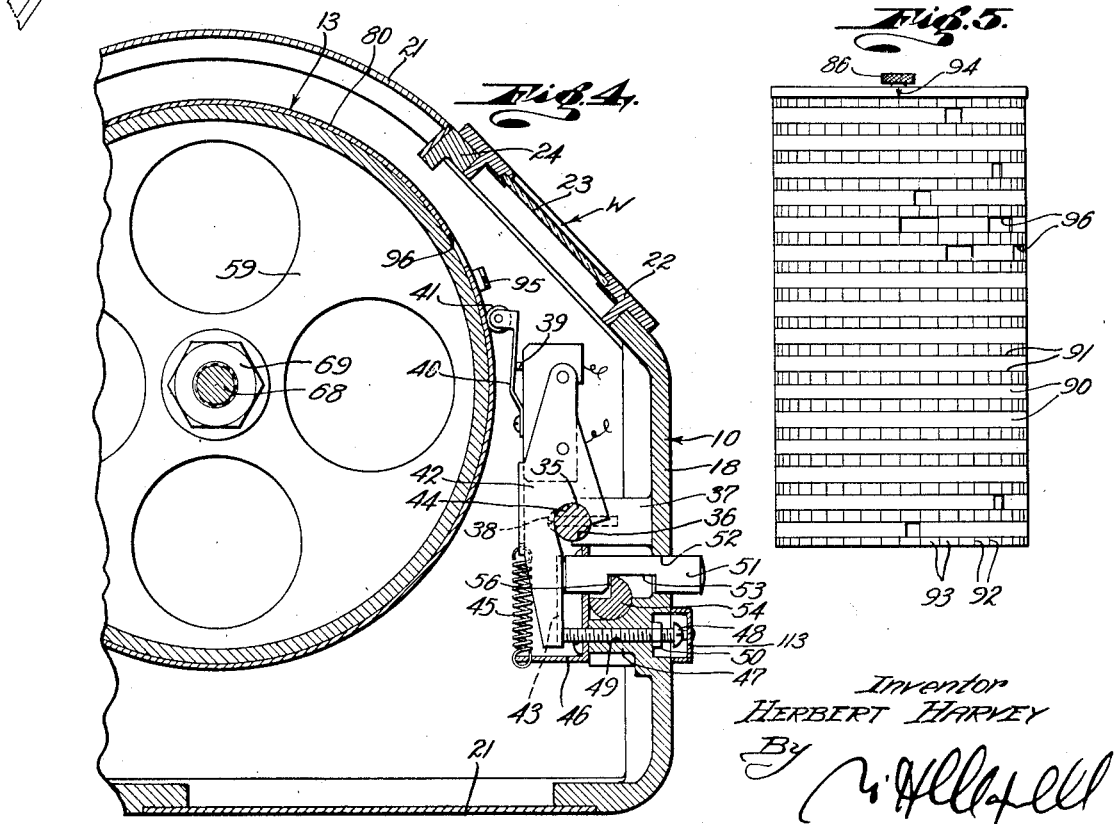
Inventor
Herbert Harvey
By
His Attorney Dec. 22, 1942.    H. HARVEY    2,306,056
CONTROL MEANS FOR WASHING MACHINES AND THE LIKE
Filed Aug. 14, 1940    2 Sheets-Sheet 2

Inventor
HERBERT HARVEY
By
His Attorney

Patented Dec. 22, 1942

2,306,056

UNITED STATES PATENT OFFICE 2,306,056

CONTROL MEANS FOR WASHING MACHINES AND THE LIKE

Herbert Harvey, Los Angeles, Calif., assignor to Leo M. Harvey, La Canada, Calif.

Application August 14, 1940, Serial No. 352,584

16 Claims. (Cl. 200—33)

This invention relates to the control of automatic and semi-automatic machinery and has particular reference to control means for electrically operated or electrically governed machine elements.

Co-pending applications Serial Numbers 352,586, 352,582, and 382,715, describe a type of commercial washing machine for performing cyclic clothes washing operations and embodying drives, valves, material supply means, heating means, etc. that are electrically governed to be remotely or automatically controlled. The control means of the present invention, while not limited to any given use or application, is well suited for the control of the various mechanisms of a commercial washing machine of the class described in said applications, and I will herein make reference to the invention as intended for this use, it being understood that such reference is not to be construed as restricting the application of the invention.

An object of this invention is to provide a simple, inexpensive and dependable control means operable to automatically initiate and terminate operations of a plurality of electrically operated or controlled mechanisms in given timed sequence and to repeat the series of successive operations to provide for the cyclic operations of the machine.

Another object of this invention is to provide a control means of the character referred to that is accurate and positive in operation, assuring the desired cyclic operations throughout any number of cycles.

Another and important object of this invention is to provide a control means of the character referred to that may be quickly, easily and inexpensively altered, adjusted or conditioned to change the sequence of operations, the time and duration of operations, the number of operations, and the relation of operations of any or all of the washing machine elements controlled thereby. The novel control means of the present invention is characterized by the ease with which it may be changed or conditioned to vary the sequence, duration, relation, etc. of the timed operations, such conditioning of the control means being performed without replacing machine parts, reshaping cams, replacing cams or gears, or performing other time consuming, expensive operations. This feature of the control means particularly adapts the invention for embodiment in forms for the control of commercial cyclic clothes washing machines wherein it is often necessary or desirable to vary the cyclic operations for the washing of material or clothes of different types. A washing machine equipped with the control means of the present invention may be quickly adapted for the performance of any required cyclic washing operations at little or no cost and without reshaping, replacing, or altering the machine elements.

Another object of this invention is to provide an automatic control means of the character mentioned embodying a control drum for governing sensitive switch elements and formed of readily cut or perforated material such as paper, cardboard, or the like, to be easily and quickly conditioned to provide for the cyclic washing machine operations in any required sequence, relation, number, time, duration, etc.

Another object of this invention is to provide a control means of the character referred to in which the control drum is very inexpensive and adapted to be easily and quickly rep'aced by similar drums having different "cuts" or numbers and arrangements of openings to produce any required or desired series of cyclic washing operations.

Another object of this invention is to provide a control means of the character referred to embodying an effective safety means for positively preventing operation of any of the washing machine elements during the recutting, replacement, or adjusting of the control drum.

Another object of this invention is to provide a control means of the character referred to that provides for the actuation of any of the washing machine mechanisms at any time and for any period by simple, manual operations of push buttons, without stopping the control and without changing the sequence of operations or the time or duration of the other operations.

A further object of this invention is to provide a control means of the character referred to that is practically fool proof and very easy to condition and put into operation.

Figure 3:
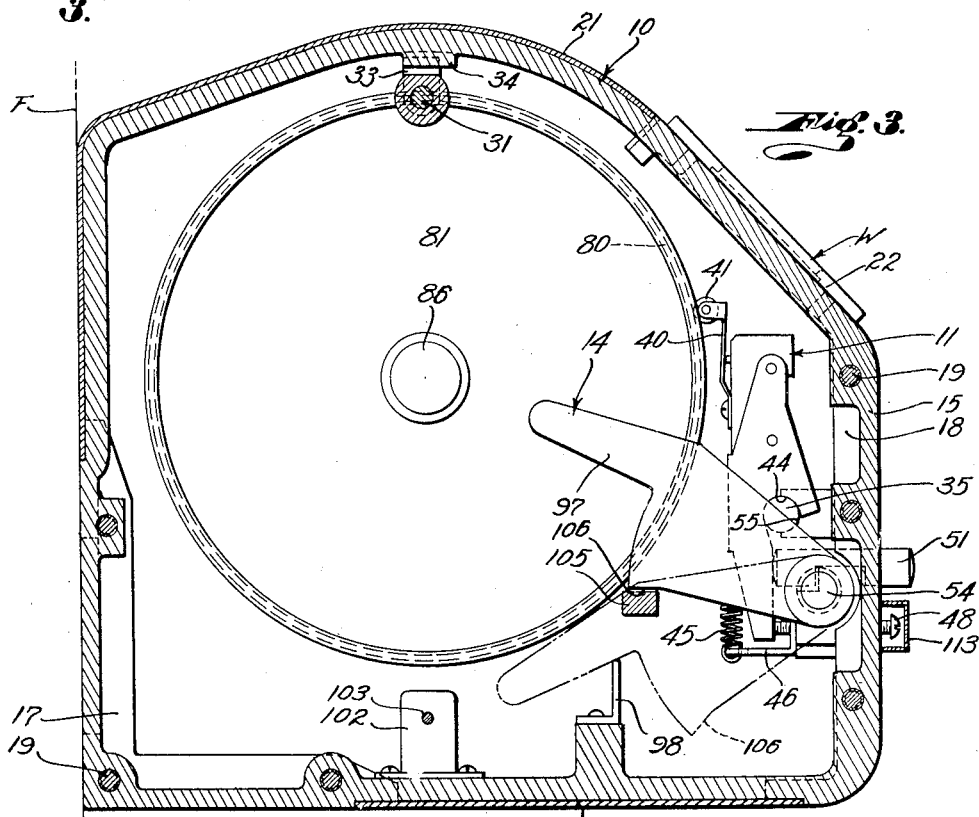
Figure 6:
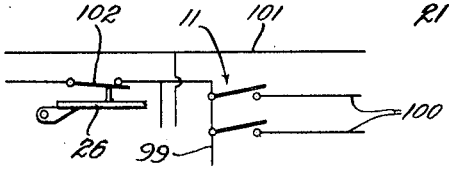

The various objects and features of my invention will be fully understood from the following detailed description of a typical preferred form and application of the invention, throughout which description reference is made to the accompanying drawings, in which:

Fig. 1 is a front view of the control means of the invention with broken lines showing the closure or door in the open position. Fig. 2 is a longitudinal detailed sectional view of the control. Fig. 3 is an enlarged, transverse, detailed sectional view taken as indicated by line 3—3 on Fig. 2. Fig. 4 is an enlarged fragmentary vertical detailed sectional view taken as indicated by line 4—4 on Fig. 1. Fig. 5 is a side elevation of a control drum removed from the mechanism and Fig. 6 is a schematic wiring diagram of the control.

The control means of the invention may be said to comprise, generally, a housing or case 10, a plurality of switches 11 mounted in the case 10, a timed drive 12 carried by the case 10, a replaceable drum 13 driven by the drive 12 and formed to control or operate the switches 11, and safety means 14 for rendering the switches 11 ineffective when the case 10 is opened to insert, remove, or condition the drum 13.

The case 10 is provided to support and house the various elements of the control means. The shape and construction of the case 10 may be varied considerably to adapt it for different installations. In the form of the invention illustrated the case 10 is adapted for attachment to a vertical support such as the frame part F of a washing machine. The case 10 comprises two end plates 15 and 16, a rear connecting panel 17 and a front panel 18. The panels 17 and 18 extend between and connect the end plates 15 and 16, being secured to the plates by suitable spaced screws 19. The plates 15 and 16 and the rear panel 17 are shaped to present a substantially vertical rear face for bearing on the vertical support or frame part F. Lugs 20 may be provided on the end plates 15 and 16 to facilitate the attachment of the case 10 to the frame part F. The front panel 18 has a substantially vertical forward face portion and slopes upwardly and rearwardly along its upper edge. Panels 21 of sheet metal or the like extend between the plates 15 and 16 to close the spaces between the panels 17 and 18 and to complete the case structure.

A window W is provided in the forward portion of the case 10. The window W may comprise a suitable panel or frame 22 having an opening provided with a sheet 23 of glass, or other transparent material. The window frame 22 may extend between the end plates 15 and 16 and its lower edge may rest on and may be secured to the sloping upper portion of the front panel 18. The upper part of the window frame 22 may be secured to a strap or bar 22 extending between and connecting the plates 15 and 16. The window W preferably faces downwardly as well as rearwardly.

The case 10 is formed to facilitate the insertion and removal of the control drum 13. The end plate 15 is annular or ring-shaped, being provided with a large central opening 25. A door 26 is provided to normally close the opening 25. The lower portions of the plate 15 and door 26 are provided with intermeshing spaced lugs 27 and pins 28 pass through openings in the lugs to hingedly secure the door to the plate. The door 26 has a window opening 29 closed by a sheet 30 of glass or other transparent material. Latch means is provided for normally holding the door 26 in the closed position. This latch means may comprise a turnable shaft 31 extending through an opening in the upper portion of the door 26 and provided at its outer end with a suitable handle or knob 32. A catch part or latch part 33 is fixed to the inner end of the shaft 31 and is cooperable with a lug 34 on the plate 15 to hold the door 26 closed.

The switches 11 are adapted to be connected in the energizing or control circuits of the various machine elements or mechanisms to be controlled and there is a switch 11 for each controlled machine element or mechanism. The switches 11 are arranged in a horizontal row or series in the forward portion of the case 10 for individual control or actuation. The plurality of switches 11 supported by a horizontally disposed rod 35 is spaced rearwardly from the inner side of the front panel 18 and is set in seats or notches 36 formed in the inner ends of lugs 37 on the panel. Screws 38 pass through transverse openings in the rod 35 and are threaded into the lugs 37 to secure the rod in place. The switches 11 are preferably very sensitive to be fully actuated by short or slight movements. I prefer to employ what are known as "micro-switches" and in the drawings have illustrated switches of the type disclosed in United States Letters Patent No. 1,960,020. Switches of this kind are capable of full control or actuation by very slight movement. The present invention is not primarily concerned with the details of the switches 11 and such details are omitted from this disclosure.

As illustrated the switches 11 are elongate, generally rectangular elements arranged in substantially upright positions in the case 10 above the supporting rod 35. The actuating elements of the switches 11 comprise shiftable rods or plungers 39 projecting from the rear faces of the switches and leaf springs 40 attached to the rear sides of the switches and adapted to engage and control the plungers 39. Freely rotatable rollers 41 are provided on the upper ends of the springs 40. The rollers 41 are mounted to face or project rearwardly. The switches 11 are closed by outward or rearward movement of the plungers 39 and are opened by inward or forward movement of the plungers.

The means for supporting the switches 11 on the rod 35 comprise brackets 42 attached to the switches 11 to project downwardly therefrom. The brackets 42 may be substantially U-shaped in transverse cross section and substantially vertical webs 43 extend between and connect their side parts at their lower ends. Downwardly facing notches or seats 44 are formed in the side parts of the brackets 42 to receive or bear on the rod 35 so that the brackets and their switches 11 are supported for pivotal movement about a common horizontal axis. Means are provided for yieldingly urging the switches rearwardly toward the rotating control drum 13. Tension springs 45 are connected with the switch brackets 42 below and rearward of the pivotal axis of the brackets and extend downwardly from the brackets. A horizontally extending angle member 46 is secured to inwardly projecting lugs 47 on the inner side of the case panel 18 and has a web or flange projecting rearwardly in the case 10. The lower ends of the springs 45 are anchored to the projecting part of the angle member 46. The springs 45 are under tension and are located to pivot or urge the upper portions of the brackets 42 and the switches 11 rearwardly toward the drum 13.

Means are provided to accurately adjust or set the switch brackets 42 to assure the correct operation of the switches 11. Set screws 48 are threaded through horizontal openings 49 in the panel 18 and the lugs 47 to project rearwardly in the case 10. The inner ends of the screws 48 are engaged by the webs 43 of the switch brackets 42. The screws 48 form stops for limiting pivoting of the switches 11 toward the drum 13. The forward ends of the screws 48 are accessible for engagement or manipulation and may have slotted heads. Lock screws 50 may be provided on the screws 48 to set or lock the screws in the adjusted positions. The switches 11 may be separately or individually adjusted by their respective screws 48 to assure their proper operation by the control drum 13.

In accordance with the invention the switches 11 have separate or individual manual control means whereby their respective washing machine elements or mechanisms may be put into operation and stopped at any time by simple manual operations independently of the control drum 13. The manual controls or actuators for the switches 11 comprise what I will term manual buttons 51. The buttons 51 may be in the nature of longitudinally shiftable rods or stems passing through horizontal openings 52 in the front case panel 18 and located to have their rear ends cooperate with the switch bracket webs 43. The buttons 51 project forwardly from the case panel 18 so that their forward ends are readily accessible. It will be seen that inward movement of a button 51 produces pivoting of the related switch bracket 42 to move the switch 11 forwardly or away from the control drum 13 to allow closing of the switch. When the manual pressure is released from the push button 51 the spring 45 automatically restores the switch 11 to its initial position. Each switch button 51 is provided between its ends with a downwardly facing flat-walled notch 53. A horizontal shaft 54 is turnably supported in grooves or seats 55 in the lugs 47 to extend under the several manual push buttons 51. A longitudinally extending V-shaped groove is formed in the turnable shaft 54 and presents a rearwardly facing shoulder 56 which is cooperable with the rear walls of the notches 53. The engagement of the shoulder 56 with the notches 53 is adapted to limit the outward movement of the buttons 51 and operates to prevent loss or detachment of the buttons. The shaft 54 further constitutes an element of the safety means 14 as will be later described.

The timed drive 12 is operable to continuously rotate the drum 13 at a given constant speed so that the drum controls the switches 11 to bring about the succession of cyclic operations of the washing machine elements. The timed drive 12 includes a spindle or cylinder 57 supported to rotate in the case 10 on a horizontal axis parallel with the common pivotal axis of turning of the several switches 11. The cylinder 57 is a tubular or hollow member and has longitudinally spaced internal webs 58 and 59. The web 58 may be at the inner end of the cylinder 57 and the web 59 is spaced between the ends of the cylinder. A central opening 60 is provided in the inner web 58 and the outer web 59 has a thickened hub 61 provided with a somewhat smaller central opening 62. The end plate 16 of the case 10 is provided with a central inwardly projecting tubular extension 63. The extension 63 projects through the opening 60 in the cylinder web 58 and has its outer end at the hub 61 on the web 59. The drive 12 further includes a shaft 64 extending longitudinally through the extension 63. The shaft 64 is rotatably supported by a bearing or bushing 65 in the outer part of the extension 63 and a bearing or bushing 66 set in a central opening in the plate 16. A shoulder 67 is provided on the shaft 64 at the inner end of the hub 61 and a shaft extension 68 of reduced diameter extends forwardly or outwardly from the shoulder 67. A nut 69 is secured to the shaft extension 68 at the outer side of the boss 61. A feather or key 70 is provided in the hub 61 to connect the cylinder 57 with the shaft 64 to rotate therewith.

The timed drive 12 further includes a motor means for rotating the shaft 64 and the cylinder 57. A suitable housing 71 is secured to the outer side of the case plate 16 and contains a synchronous electric motor 72. The motor 72 may be secured to projecting bosses 73 on the plate 16. A speed reduction unit 74 is associated with the motor 72 and is enclosed in the housing 71. The slow speed shaft 75 of the speed reduction unit 74 is received in an opening 76 in the shaft 64 by a set screw 77. The set screw 77 may serve to secure a thrust collar 78 to the projecting end portion of the shaft 64. It will be seen that the motor 72 drives the cylinder 57 through the medium of the speed reduction unit 74 and shaft 64. The motor drive operates to rotate the cylinder 57 at a slow uniform rate. For example the cylinder 57 may be driven to complete one revolution in one hour, 80 minutes, or longer. The energizing leads 79 of the synchronous motor 72 may extend from the control means to a suitable control switch. In practice the energizing circuit of the motor 72 may be controlled by the circuit breaker or switch which governs the rotating clothes-containing washing cylinder of the washing machine so that the drum 13 of the control means is in operation when this washing machine element is in service.

The drum 13 engages and controls the actuating rollers 41 of the switches 11 to govern the operation of the switches. In accordance with the invention the drum 13 is easily formed, altered, or conditioned to provide for the operation of the switches 11 in any desired order for any required periods, etc. Further, the drum 13 may be set, adjusted, or arranged to cause the start of the cyclic control operations at any selected time. The control drum 13 is a tubular shell or sleeve-like member designed to be slid onto the cylinder 57. The control drum 13 comprises a cylindrical wall or body 80 formed of a material that may be readily cut, perforated, distorted, or otherwise shaped to have shoulders, depressions, or openings in its periphery. In practice the drum body 18 may be formed of paper, cardboard, or similar fibrous material. The drum wall or body 80 is formed to initially have a plain, cylindrical outer surface and to be of uniform thickness throughout. The drum body 80 is proportioned to be readily slid on the cylinder 57 from the outer end of the cylinder and may be of substantially the same length as the cylinder.

The drum 13 further includes a head or end plate 81. The end plate 81 is a disc-like part of sheet metal, or the like, secured to the outer end of the drum body 80. The periphery of the end plate 80 is seamed, flanged, or otherwise secured to the outer end of the drum wall 80. As illustrated the end plate 81 may be a flat member closing the outer end of the drum 13 and designed to engage against the outer end of the shaft extension 68. A central opening 82 is formed in the end plate 81 to register with a central socket 83 in the outer end of the shaft extension 68.

Releasable means is provided for securing the drum 13 in given or selected rotative positions on the cylinder 57. This means includes a screw 84 threaded in the socket 83 and provided with a plain or unthreaded enlargement 85 shiftable in a counterbore of the socket. A plain or unthreaded part of the screw 84 extends outwardly through the opening 82 in the end plate 81 and a suitable handle or knob 86 is fixed to its projecting part. A washer 87 is arranged on the screw 84 at the outer side of the plate 81. The screw 84 with its knob 86 and washer 87 forms a part of the drum 13, being carried by the plate 81. When the drum 13 is in position on the cylinder 57 the screw 84 is threaded in the socket 83 to attach the drum to the cylinder. Prior to tightening of the screw 84 the drum 13 may be turned and brought to its correct rotative position and when the drum is in this position the screw 84 may be tightened to dependably hold the drum against shifting and turning on the cylinder 57.

The periphery or surface of the drum 80 is engaged by the rollers 41 for the control or actuation of the switches 11. The parts are related so that the rollers 41 engage the forward part of the drum 13 at points where they are visible through the window W and the engagement is such that the springs 40 are normally flexed or conditioned to hold the switches 11 in the open condition. The switch rollers 41 engage the surface of the drum 13 at spaced zones which I will term paths 90 (see Fig. 5). The paths 90 may be defined by longitudinally spaced circumferential lines 91 printed or otherwise provided on the surface of the drum 13. There is a path 90 for the roller 41 of each switch 11. It is preferred to provide the surface of the drum 11 with longitudinal lines 92 representing time or sequence factors. The lines 93 may be equally spaced so that the areas 93 between them represent equal time periods. In practice each area 93 may represent two minutes or a similar time period. The time lines 92 may be continuous to extend from one end of the drum to the other. In the drawings I have shown the lines 92 interrupted by the paths 90 to simplify the showing. One of the time lines 92 may be the starting line and an arrow 94 may be provided on the drum 13 at this line to cooperate with a fixed pointer 95 in the case 10.

In accordance with the invention the roller paths 90 are adapted to be depressed, shouldered, recessed, or cut out at selected areas to allow or cause operation of their respective switches 11 at given times and for given periods. As above described, the drum 13 is formed of a material that is readily cut or perforated. If desired, the drum 13 may be cut at the time of manufacture to provide for given cyclic operations of the washing machine and to provide for different soap formula operations, etc. However, in other cases the drum 13 may be supplied in the uncut condition and the operator of the machine may make perforations or openings in the paths 90 to cause the washing machine to carry on the required or selected cyclic operations. In the drawings I have shown the paths 90 provided with typical cut out parts or openings 96. As illustrated, the paths 90 may each have one or more openings 96. The time lines 92 greatly facilitate the cutting of the openings 96 to assure operation of the switches 11 at selected times and for selected durations. For example, where each time space or area 93 represents two minutes the switch 11 governed by a given path 90 may be made to stay open for two minutes by forming an opening 96 in the path the width of one of the areas 93 and this opening 96 may be positioned circumferentially of the drum 13 to cause the switch operation at any phase of the washing machine operations.

The openings 96 may be perforations extending through the wall of the control drum 13 so that the depth of the openings 96 is equal to the drum wall thickness. As above described, the switches 11 are sensitive to operate with slight movement and the movement of their rollers 41 into and out of the openings 96 produces complete switch closing and opening, respectively. It is believed that it will be understood how the drum 13 may be provided with openings 96 in selected paths 90 to bring about any required sequence of switch operations for each revolution of the drum 13. The circumferential extent of the drum 13 and the speed of rotation of the drum is such that there may be a plurality of series of switch actions during each revolution of the drum and these actions may be such that the washing machine carries on a complete washing operation with selected washing formulas such as soap mixtures, rinses, sours, etc. It is to be observed that the openings 96 or any one of the openings may be lengthened at any time to increase the duration of the related switch operations.

The drum 13 just described forms the subject of co-pending application Serial No. 382,834, filed March 11, 1941.

The safety means 14 renders the several switches 11 ineffective for the control of their respective washing machine elements or mechanisms and prevents injury of the switch parts when the drum 13 is being installed, replaced, adjusted, or recut. The safety means 14 includes a lever 97 fixed to the shaft 54 to be adjacent the door 26 of the case 10. The lever 97 is formed and positioned to project rearwardly at the adjacent end of the cylinder 57 and drum 13 when the shaft 54 is in its normal rotative position with the switches 11 conditioned for operation. The full lines of Fig. 3 illustrate the lever 97 projecting rearwardly to be in the path of the drum 13 where it prevents the drum from being removed from the cylinder 57. With this positioning of the lever 97 the operator is obliged to swing or move the lever downwardly out of the path of the drum 13 if he desires to install or remove the drum. The broken lines of Fig. 3 show the lever 97 in its retracted position out of the path of the drum 13. A suitable stop 98 may be provided in the case 97 to support the lever 97 in its retracted position.

The safety means 14 further includes a switch structure for disabling or rendering the switches 11 ineffective. As illustrated in Fig. 6 of the drawings the several switches 11 are connected in a single circuit to each have one terminal connected in a common power lead 99 and to each have a controlled lead 100 extend from the other terminals to the controlled washing machine elements or mechanisms. The second electrical supply line 101 extends to the operated or controlled washing machine elements or mechanisms so that closing of a switch 11 completes the circuit from the line 99 through the switch 11 and its lead 100 to the second power lead 101. The safety means 14 includes a switch 102 interposed in the common supply lead 99. The switch 102 is mounted in the lower portion of the case 10 adjacent the door 26. The switch 102 is controlled by a shiftable plunger 103. The plunger 103 is engageable by the inner side of the door 26 and when the door 26 is in the closed position it depresses the plunger 103 to hold the switch 102 in the closed condition. When the door 26 is opened it is moved away from the plunger 103 and the switch 102 opens. Opening of the switch 102 in the common line 99 renders the plurality of switches 11 inactive so that they are no longer able to control their related washing machine elements or mechanisms. Accordingly, opening of the switches 11, by the drum 13 or by manual operation of the buttons 51, following opening of the access door 26 has no effect upon the washing machine mechanisms or elements. As above described, the lever 97 is initially in the path of the drum 13 so that the operator must swing it to the retracted position before removing the drum. However, before the operator can retract the lever 97 he is obliged to open the door 26. This opening of the door 26 causes opening of the switch 102 as just described, so that the several switches 11 are rendered ineffective simultaneously with the opening of the door 26. When the door 26 is opened the lever 97 may be swung to the retracted position and this operation causes turning of the shaft 54. Retraction of the lever 97 turns the shaft 54 so that the shoulder 56 cooperating with the notches 53 pivots the several switches 11 forwardly. This moves the switch rollers 41 out of engagement with the drum 13 and, of course, results in closing of the switches. However, as the switch 102 has opened simultaneously with the opening of the access door 26 this closing of the several switches 11 has no effect upon the washing machine.

It is to be noted that retraction of the lever 97 to permit the installation, removal or adjustment of the drum 13 automatically swings the switches 11 away from the drum 13 so that their actuating rollers 41 and springs 40 cannot be injured. With the lever 97 in the retracted position the screw 84 may be unthreaded from the socket 83 to free the drum 13 for adjustment or removal. The drum 13 may be readily passed into or out of the opening 25 in the end plate 15. The safety means 14 positively prevents operation of any of the washing machine elements by the control means when the drum 13 is being installed or replaced. The shaft 54 holds the push buttons 51 against manual operation when the lever 97 is in its retracted position. With the lever 97 in the retracted position the cylindrical portion of the shaft 54 is engaged in the notches 53 and the springs 45 cannot return the lever 97 to its normal raised position. Manual restoration of the lever 97 to its normal position returns the shaft 54 to the position where its shoulder 56 cooperates with the notches 53 and the springs 45 automatically return the switches 11 to their active normal positions with their rollers 41 in engagement with the drum 13.

The safety means 14 further includes means which prevents closing of the door 23 prior to the restoration of the lever 97 to its normal position. A lug 105 projects inwardly from the door 26 to cooperate with the lever 97. The lever 97 is provided with a straight downwardly facing lower edge 106 and the lug 105 is located to project under or cooperate with the edge 106 when the door 26 is closed and the lever 97 is in its raised normal position. However, when the lever 97 is in its lowered position illustrated in broken lines in Fig. 3 the lug 105 is engageable with the face of the lever. This engagement of the lug 105 with the face of the lever 97 prevents closing of the door 26 indicating to the operator that he has neglected to return the lever 97 to its normal position to condition the switches 11 for operation. The door 26 is hinged at its lower edge and, therefore, swings open or remains fully open unless brought to the full closed position and then latched by means of the latch part 33. With the lever 97 in its down position it is impossible to fully close the door 26 and even though the door be suddenly shut or slammed it automatically swings open indicating to the operator that the lever 97 has not been restored to condition the control for operation.

The rear panel 17 of the case 10 may have an opening 107 to receive the lines 99, 101, 79 and any other wires or conduits that may be required in the case 10. The end plate 16 of the case 10 may have an opening 108 for receiving the wires 79 so that the wires may be run through the case to the opening 107.

It is believed that the operation of the control means provided by this invention will be readily understood from the foregoing detailed description. With the door 26 closed and the motor 72 in operation the control means operates to automatically govern the plurality of switches 11 to provide for the continuous cyclic operations of the washing machine. The manual push buttons 51 may have name plates 112 designating the various washing machine parts or mechanisms controlled by the related switches 11 and the operator by looking through the window W may observe the action of the control means. The name plates 112 may form parts of or may be carried by a removable cover 113 for the heads of the screws 48. As above described, the drum 13 may be formed to provide for any desired washing machine formulas and washing machine operations and may be replaced by similar drums having openings 96 of different sizes, locations, etc. for carrying on different washing formula operations, etc. The drum 13 is easily and quickly installed, removed and adjusted. The openings 96 may be readily cut in the drum 13 to produce the selected washing machine operations and, if desired, may be lengthened to extend any given operation or operations.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. Control means of the character described comprising a rotating element, a removable member rotating with the element and having one or more openings, and a complete switch separate from the element and member and including an actuating part engaging the member to be operated through cooperation with said one or more openings.

2. Control means of the character described comprising a rotating cylinder element, a tubular drum removably slid on the element to rotate with the element and formed of readily cut material so that openings may be formed in it, and a complete switch separate from the element and drum and cooperating with the drum to be operated by such openings.

3. Control means of the character described comprising a control member having a tubular wall of readily formable or cuttable material whereby openings may be formed in it at selected points, means for rotating the control member at a given speed, and one or more complete switches separate from the member having actuating parts engaging the said wall to be operated by said openings.

4. Control means of the character described comprising a control member having a tubular wall of readily formable or cuttable material whereby openings may be formed in it at selected points, means for rotating the control member at a given speed, a complete switch separate from the control member having a movable operating part, and means for supporting the switch for movement between a position where its operating part engages the wall for operation by said openings and a position where said part is retracted from the wall.

5. Control means of the character described comprising a plurality of switches each having at least a pair of contacts and a movable actuating part, a rotatable cylinder, a tubular paper drum removably arranged on the cylinder to rotate therewith and having openings in its periphery, and means supporting the switches independently of the cylinder to have their actuating parts engage the drum to be controlled by cooperation with said opening.

6. Control means of the character described comprising a plurality of separate complete switches each having at least a pair of contacts and a movable actuating part, a rotatable element, a drum member removably slid on the element to rotate therewith and having openings, a drive for rotating the element and member at a given speed, and means for supporting the switches to have their actuating parts engage the member so that they are operated by cooperation with said openings, said member being formed of fibrous readily cut material so that said openings may be readily formed to provide for selected operation of the switches.

7. Control means of the character described comprising a case having an access opening, a spindle member rotating in the case at a given speed, a tubular control drum removably arranged on the spindle member to rotate therewith and be passed out of the case through said access opening, the drum having a control opening, mechanism controlling elements mounted in the case independently of the door and engaging the drum to be operated by the openings therein, a door for said access opening, and means for rendering said elements ineffective when the door is open.

8. Control means of the character described comprising a case having an access opening, a door for the access opening, a spindle member rotating in the case at a given speed, a tubular control drum removably arranged on the spindle member to rotate therewith and be passed out of the case through said access opening, the drum having control openings, switches mounted in the case independently of the door and having actuating parts cooperable with the drum to be operated through engagement with the control openings, and switch means for rendering said switches ineffective when the door is opened to allow insertion or removal of the drum.

9. Control means of the character described comprising a case having an access opening, a door for closing the access opening and movable to an open position, a spindle member rotating in the case at a given speed, a control drum removably arranged on the spindle member to rotate therewith and be passed out of the case through said access opening, the drum having a control opening, a complete switch in the case having an actuating part, means supporting the switch for movement between a position where said part engages the drum to be operated through cooperation with the control opening and a position where said part is retracted from the drum, means for moving the switch between said positions, and means for preventing closing of the door when the last named means is in the condition where the switch is retracted.

10. Control means of the character described comprising a case having an access opening, a spindle rotating in the case at a given speed, a control member removably arranged on the spindle to rotate therewith and be passed out of the case through said access opening, the member having a plurality of control openings, a plurality of switches in the case having actuating parts engageable with the member to be controlled by the control openings therein, a door for the access opening, means for moving the switches to positions where said parts are retracted from the member accessible only when the door is open, and means for preventing closing of the door when the last named means is operated.

11. Control means of the character described comprising a case having an access opening, a spindle member rotating in the case at a given speed, a control drum removably arranged on the spindle member to rotate therewith and be passed out of the case through said access opening, the drum having a plurality of control openings, a plurality of switches in the case having actuating parts engageable with the drum to be controlled by the control openings therein, a door for the access opening operable upon opening of the door for rendering the switches ineffective, means for moving the switches to positions where said parts are retracted from the drum accessible only when the door is open, and means for preventing closing of the door when the last named means is operated.

12. Control means of the character described comprising a case, a plurality of switches in the case each having a movable actuating part, a rotatable cylinder in the case, a tubular drum arranged on the cylinder to rotate therewith and having openings in its periphery, means supporting the switches in the case to have their actuating parts engage the drum to be controlled by cooperation with said openings, and manual means accessible at the exterior of the case for operating the individual switches independently of the drum.

13. Control means of the character described comprising a case, a plurality of switches in the case each having a movable actuating part, a rotatable cylinder in the case, a tubular drum removably arranged on the cylinder to rotate therewith and having openings in its periphery, means supporting the switches in the case to have their actuating parts engage the drum to be controlled by cooperation with said openings, and means accessible at the exterior of the case for individually adjusting the switches so that their actuating parts have correct cooperation with the drum.

14. Control means for a plurality of electrically operated or controlled machine elements comprising a controlling or operating circuit having connections with said elements and having a common supply line, a case having an access opening provided with a door, a rotatable spindle in the case, a tubular control drum turned by the spindle and insertable and removable through the access opening, the drum having control openings and being replaceable by drums having control openings in different positions, a plurality of switches separate from the spindle and drum connected in said circuit between the common line and said elements to control said elements, means separate from the door for supporting the switches in the case to cooperate with the drum for operation by said control openings, and a switch in said common line opened by opening of the door whereby the switches are ineffective when the drum is being installed and replaced.

15. Control means for a plurality of electrically operated or controlled machine elements comprising a controlling or operating circuit having connections with said elements and having a common supply line, a case having an access opening provided with a door, a rotatable spindle in the case, a tubular control drum turned by the spindle and insertable and removable through the access opening, the drum having control openings and being replaceable by drums having control openings in different positions, a plurality of switches separate from the spindle and drum connected in said circuit between the common line and said elements to control said elements, means separate from the door movably supporting the switches in the case to cooperate with the drum for operation by said control openings, means for retracting the switches from the spindle to facilitate the installation and removal of the drum, and a switch in said common line opened by opening of the door whereby the switches are ineffective when the drum is being installed and replaced.

16. Control means for a plurality of electrically operated or controlled machine elements comprising a controlling or operating circuit having connections with said elements and having a common supply line, a rotating spindle, a tubular drum for arrangement on the spindle means for securing the drum to the spindle to rotate therewith and releasable to allow rotary adjustment of the drum on the spindle, the drum having a plurality of control openings, and switches connected in said circuit between the common line and said elements and cooperating with the drum to be controlled by said openings, the drum being formed of a material that is readily manually cut to have said openings in selected positions to cause operation of said elements in any sequence and for any time periods, said rotary adjustment of the drum changing the time at which the series of operations is begun.

HERBERT HARVEY.